United States Patent [19]

Reichle et al.

[11] Patent Number: 5,527,752
[45] Date of Patent: Jun. 18, 1996

[54] CATALYSTS FOR THE PRODUCTION OF POLYOLEFINS

[75] Inventors: Walter T. Reichle, Warren; Frederick J. Karol, Belle Mead, both of N.J.; Gregory T. Whiteker, Charleston, W. Va.

[73] Assignee: Union Carbide Chemicals & Plastics Technology Corporation, Danbury, Conn.

[21] Appl. No.: 412,964

[22] Filed: Mar. 29, 1995

[51] Int. Cl.$^6$ .................................................. C08F 4/642
[52] U.S. Cl. ........................... 502/117; 502/123; 556/51; 556/52; 556/55; 556/11; 556/14; 556/31; 526/160
[58] Field of Search ................................. 502/117, 123; 552/51, 52, 55

[56] References Cited

U.S. PATENT DOCUMENTS

| | | | |
|---|---|---|---|
| 3,542,693 | 11/1970 | Price et al. | 502/124 |
| 4,892,914 | 1/1990 | Hefner | 526/114 |
| 5,055,438 | 10/1991 | Canich | 502/117 |
| 5,132,380 | 7/1992 | Stevens et al. | 526/126 |
| 5,194,532 | 3/1993 | Hefner et al. | 526/126 |
| 5,223,465 | 6/1993 | Ueki et al. | 502/117 |
| 5,227,440 | 7/1993 | Canich et al. | 526/129 |
| 5,272,236 | 12/1993 | Lai et al. | 526/348.5 |
| 5,279,999 | 1/1994 | DeBoer et al. | 502/117 |
| 5,312,938 | 5/1994 | Hefner et al. | 556/11 |
| 5,318,935 | 6/1994 | Canich et al. | 502/117 |
| 5,331,071 | 7/1994 | Kataoka et al. | 526/128 |
| 5,374,696 | 12/1994 | Rosen et al. | 526/126 |

FOREIGN PATENT DOCUMENTS

| | | |
|---|---|---|
| 0476671A2 | 3/1992 | European Pat. Off. . |
| 0509233A2 | 10/1992 | European Pat. Off. . |
| 0520811A2 | 12/1992 | European Pat. Off. . |
| 0595390A1 | 10/1993 | European Pat. Off. . |

OTHER PUBLICATIONS

Chernega, A. N., "mono—η—cyclopentadienyl—benzamidinato Compounds of Titanium, Zirconium and Hafnium", *J. Chem. Commun.*, pp. 1415–1417, (1993).

Hughes, A. K., "Efficient New Synthetic Route to Bidentate, Monomeric Cyclopentadienyl—Amide . . . ", *Organometallics* 1993, 12, 1936–1945.

*Primary Examiner*—Mark Nagumo
*Attorney, Agent, or Firm*—P. W. Leuzzi

[57] ABSTRACT

A catalyst precursor is provided which is useful, when combined with a cocatalyst, in the manufacture of polyolefins. The catalyst precursor is of the formula:

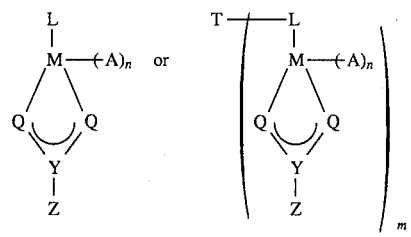

where M is a transition metal, preferably Zr or Hf; L is a substituted or unsubstituted, π bonded ligand coordinated to M, preferably a cyclopentadienyl-type ligand; Q can be the same or different and is independently selected from the group consisting of —O, —NR, —CR$_2$ and —S; Y is either C or S; Z is selected from the group consisting of —OR, —NR$_2$, —CR$_3$, —SR, —SiR$_3$, —PR$_2$ or H; n is 1 or 2; A is a univalent anionic group when n is 2 or W is a divalent anionic group when n is 1; R can be the same or different and is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl or an aryl group and one or more may be attached to the L substituent; B is a bridging group selected from the group consisting of an alkylene or arylene group containing from 1 to 10 carbon atoms, germanium, silicon and alkyl phosphine; and m is 1 to 7, preferably 2 to 6, most preferably 2 or 3.

21 Claims, No Drawings

CATALYSTS FOR THE PRODUCTION OF POLYOLEFINS

FIELD

The present invention relates to a novel family of catalysts useful in the production of polyolefins, such as polyethylene, polypropylene and their copolymers with other alpha-olefins. More specifically, this invention relates to complexes of transition metals, substituted or unsubstituted π-bonded ligands and heteroallyl moieties.

BACKGROUND

Numerous of polyolefin catalysts have been developed which provide polyolefins with certain properties. One class of these catalysts are metallocenes, organometallic coordination complexes containing two π-bonded moieties in association with a metal atom from Groups IIIB to VIII or the Lanthanide series of the Periodic Table of Elements. These catalysts are reportedly highly useful in the preparation of polyolefins because they produce homogeneous polymers at excellent polymerization rates, allowing one to closely tailor the final properties of the polymer as desired.

A new class of olefin polymerization catalysts have now been discovered which, when combined with a cocatalyst, such as aluminoxane, form a catalyst composition having very good polymerization activity and productivity, are easily prepared, inexpensive, and have excellent processing characteristics. The catalysts are complexes of transition metals, substituted or unsubstituted π-bonded ligands and heteroallyl moieties.

Complexes of transition metals and cyclopentadienyl-type ligands with various other functionalities are well known. For example, U.S. Pat. No. 5,279,999 relates to catalyst compositions obtained by contacting a Group IVB metal compound of the formula $(Cp)_pMeX_{4-p}$, wherein each Cp is a substituted cyclopentadienyl group; Me is a Group IVB metal; each X is a hydrocarbyl group, alkoxy or aryloxy group, alkylamide or arylamide group, hydrogen, or halogen; and p is from 1 to 4.

U.S. Pat. No. 5,194,532 describes another catalyst represented by the formula $LTi(NR_2)_3$, wherein L is a π-bonded ligand selected from indenyl, $C_1$-$C_4$ alkyl substituted indenyl, and —$OSiR_3$ substituted indenyl; and R is a $C_1$-$C_4$ alkyl group.

U.S. Pat. No. 5,227,440 relates to supported catalysts containing a Group IVB transition metal component of the formula:

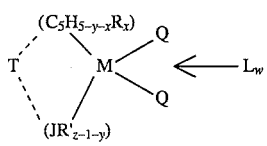

wherein M is Zr, Hf, or Ti in its highest formal oxidation state; $(C_{5η5-y-x}R_x)$ is a cyclopentadienyl ring (or fused aromatic ring system) containing up to five substituents R; $(JR'_{z-1-y})$ is a heteroatom ligand in which J is a Group VA element with a coordination number of three or a Group VIA element with a coordination number of two; and each R' is a $C_1$-$C_{20}$ hydrocarbyl, substituted hydrocarbyl radical, or any other radical containing a Lewis acidic or basic functionality; each Q is any univalent anionic ligand; T is a covalent bridging group containing a Group IVA or VA element; and L is a neutral Lewis base.

EP 0 595 390 A1 discusses a catalyst system containing a bis(cyclopentadienyl) bis(amide) derivative of a Group IVB element.

Hughes et al., *Organometallics*, Vol. 12, No. 5, p. 1936 (1993) discloses various cyclopentadienyl-amide-Group IV metal complexes and their synthesis.

U.S. Pat. No. 3,542,693 relates to a catalyst system for the copolymerization of ethylene with other unsaturated hydrocarbons consisting of the product obtained by mixing, in an inert solvent, a vanadium salt, an alkyl aluminum dihalide, and a N,N-disubstituted carbamate having the formula:

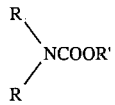

wherein R and R' are hydrocarbon radicals that contain no unsaturation other than that derived from aromatic radicals.

EP 0 520 811 A2 and U.S. Pat. No. 5,331,071 relate to catalyst systems containing metal-alkoxide complexes. EP 0 520 811 A2 discloses a catalyst component comprised of a first compound of the formula $M^1(OR^1)_pR^2_qX^1_{4-p-q}$, wherein $M^1$ is Ti, Zr, or Hf; $R^1$ and $R^2$ are each hydrocarbon moieties of 1–24 carbons; and $X^1$ is a halogen; and a second compound that is an organocyclic compound having two or more conjugated double bonds. U.S. Pat. No. 5,331,071 relates to a catalyst component derived from reacting a compound of the formula $Me^1R^1_nX^1_{4-n}$, a compound of the formula $Me^2R^2_mX^2_{z-m}$, an organocyclic compound having two or more conjugated double bonds and a carrier material. $Me^1$ is Zr, Ti, or Hf; $R^1$ is a $C_1$-$C_{24}$ hydrocarbon; and $X^1$ is a halogen. $Me^2$ is a Group I-III element; $R^2$ is a $C_1$-$C_{24}$ hydrocarbon; and $X^2$ is a $C_1$-$C_{12}$ alkoxy group or a halogen atom.

However, none of the above teach or suggest coordination complexes of Group IVB transition metals, substituted or unsubstituted, π-bonded ligands and heteroallyl moieties or the use of such complexes as catalysts for the polymerization of olefins.

SUMMARY OF THE INVENTION

The invention provides a novel catalyst class for the production of polyolefins. This catalyst is generated by reacting a catalyst precursor of either Formula I or Formula II as set forth below with a cocatalyst, such as MAO or MMAO, to generate the catalyst.

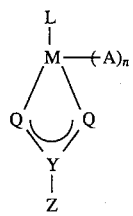

Formula I wherein:

M is a transition metal, preferably Zr or Hf;

L is a substituted or unsubstituted, π-bonded ligand coordinated to M, preferably a cyclopentadienyl-type ligand;

Q can be the same or different and is independently selected from the group consisting of —O—, —NR—, —$CR_2$— and —S—;

Y is either C or S;

Z is selected from the group consisting of —OR, —NR$_2$, —CR$_3$, —SR, —SiR$_3$, —PR$_2$ or —H, with the proviso that when Q is —NR— then Z is selected from the group consisting of —OR, —NR$_2$, —SR, —SiR$_3$, —PR$_2$ and —H;

n is 1 or 2;

A is a univalent anionic group when n is 2 or A is a divalent anionic group when n is 1; and R can be the same or different and is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl or an aryl group.

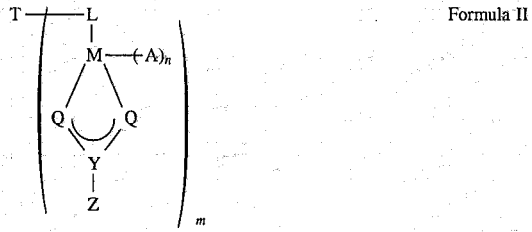

Formula II wherein:

M is a transition metal, preferably Zr or Hf;

L is a substituted or unsubstituted, π-bonded ligand coordinated to M, preferably a cyclopentadienyl-type ligand;

Q can be the same or different and is independently selected from the group consisting of —O—, —NR—, —CR$_2$— and —S—

Y is either C or S;

Z is selected from the group consisting of —OR, —NR$_2$, —CR$_3$, —SR, —SiR$_3$, —PR$_2$ or —H, with the proviso that when Q is —NR— then Z is selected from the group consisting of —OR, —NR$_2$, —SR, —SiR$_3$, —PR$_2$ and —H;

n is 1 or 2;

A is a univalent anionic group when n is 2 or A is a divalent anionic group when n is 1;

R can be the same or different and is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl or an aryl group;

T is a bridging group connecting selected from the group consisting of an alkylene or arylene group containing from 1 to 10 carbon atoms optionally substituted with carbon or heteroatoms, germanium, silicon and alkyl phosphine; and m is 1 to 7, preferably 2 to 6, most preferably 2 or 3.

The invention further relates to a catalyst composition for the production of polyolefins, which comprises one of the above catalyst precursors and an activating cocatalyst.

Finally, the invention provides a process for producing a polyolefin as well as the polyolefins produced by this process, which comprises contacting an olefin or mixtures thereof, under polymerization conditions, with a catalyst composition comprising one of the above catalyst precursors and an activating cocatalyst.

DETAILED DESCRIPTION OF THE INVENTION

In accordance with the present invention there is provided complexes of transition metals, substituted or unsubstituted π-bonded ligands and heteroallyl moieties, these complexes are useful as catalyst precursors for catalysts used in producing polyolefins. Polyolefins that can be produced using these catalysts include, but are not limited to, homopolymers, copolymers and terpolymers of ethylene and higher alpha-olefins containing 3 to about 12 carbon atoms such as propylene, 1-butene, 1-pentene, 1-hexene, 4-methyl-1-pentene, and 1-octene, with densities ranging from about 0.86 to about 0.97; polypropylene; ethylene/propylene rubbers (EPR's); ethylene/propylene/diene terpolymers (EPDM's); and the like.

This catalyst is generated by reacting a catalyst precursor of either Formula I or Formula II as set forth below with a cocatalyst, such as MAO or MMAO, to generate the catalyst.

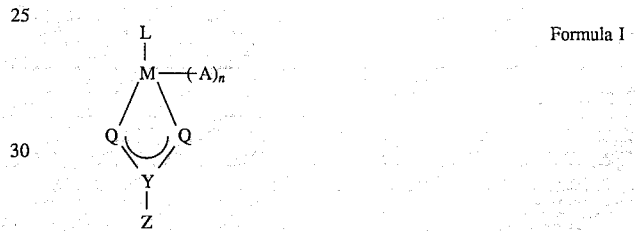

Formula I wherein:

M is a transition metal, preferably Zr or Hf;

L is a substituted or unsubstituted, π-bonded ligand coordinated to M, preferably a substituted cyclopentadienyl-type ligand;

Q can be the same or different and is independently selected from the group consisting of —O—, —NR—, —CR$_2$— and —S—, preferably oxygen;

Y is either C or S, preferably carbon;

Z is selected from the group consisting of —OR, —NR$_2$, —CR$_3$, —SR, —SiR$_3$, —PR$_2$ or —H, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$;

n is 1 or 2;

W is a univalent anionic group when n is 2 or A is a divalent anionic group when n is 1, preferably A is a carbamate, carboxylate or other heteroallyl moiety described by the combination of Q, Y and Z and R can be the same or different and is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl or an aryl group and one or more may be attached to the L substituent.

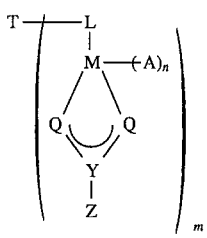

Formula II wherein:

M is a transition metal, preferably Zr or Hf;

L is a substituted or unsubstituted, π-bonded ligand coordinated to M, preferably a substituted cyclopentadienyl-type ligand;

Q can be the same or different and is independently selected from the group consisting of —O—, —NR—, —CR$_2$— and —S—, preferably oxygen;

Y is either C or S, preferably carbon;

Z is selected from the group consisting of —OR, —NR$_2$, —CR$_3$, —SR, —SiR$_3$, —PR$_2$ or —H, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$;

n is 1 or 2;

A is a univalent anionic group when n is 2 or A is a divalent anionic group when n is 1, preferably is a carbamate, carboxylate or other heteroallyl moiety described by the combination of Q, Y and Z;

R can be the same or different and is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl or an aryl group and one or more may be attached to the L substituent;

T is a bridging group connecting selected from the group consisting of an alkylene or arylene group containing from 1 to 10 carbon atoms optionally substituted with carbon or heteroatoms, germanium, silicon and alkyl phosphine; and m is 1 to 7, preferably 2 to 6, most preferably 2 or 3.

The supportive substituent formed by Q, Y and Z is a unicharged polydentate ligand exerting electronic effects due to its high polarizibility, similar to the Cp' group. In the most preferred embodiments of this invention, the disubstituted carbamates,

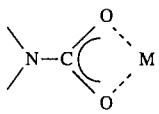

and the carboxylates

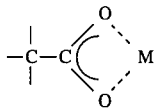

are employed. A particularly preferred embodiment of the invention is the indenyl zirconium tris(diethylcarbamate).

The catalyst precursor of the present invention may be made using any conventional process; the method of manufacture not being critical. In a preferred method of manufacturing this catalyst, a source of cyclopentadienyl-type ligand is reacted with a metal compound of the formula M(NR$_2$)$_4$ in which M and R are defined above to introduce the cyclopentadienyl-type ligand onto the metal compound. The resulting product is then dissolved in an inert solvent, such as toluene, and the heterocummulene such as in this instance CO$_2$, is contacted with the dissolved product to insert into one or more M-NR$_2$ bonds to form, in this instance, a carbamate. These precursors are then reacted with an activator, such as aluminoxane, to form the active catalyst.

Examples of other catalyst precursors include indenyl zirconium tris(pivalate), indenyl zirconium tris(p-toluate) zirconium tris(pivalate), indenyl zirconium tris(p-toluate), indenyl zirconium tris(benzoate), (1-methylindenyl)zirconium tris(pivalate), (2-methylindenyl) zirconium tris(diethylcarbamate), (methylcyclopentadienyl) zirconium tris(pivalate), cyclopentadienyl tris(pivalate), and (pentamethylcyclopentadienyl) zirconium tris(benzoate).

As noted above, these catalyst precursors are used in conjunction with activating cocatalysts to form catalyst compositions for the production of polyolefins. Preferably, the activating cocatalysts are one of the following: (a) branched or cyclic oligomeric poly(hydrocarbylaluminum oxide) that contain repeating units of the general formula —(Al(R)O)—, where R is an alkyl radical containing from 1 to about 12 carbon atoms, or an aryl radical such as a substituted or unsubstituted phenyl or naphthyl group or (b) borates, such as tri(pentafluorophenyl)borate and the like.

Preferably, the activating cocatalyst is a branched or cyclic oligomeric poly(hydrocarbylaluminum oxide). More preferably, the activating cocatalyst is an aluminoxane such as methylaluminoxane (MAO) or modified methylaluminoxane (MMAO).

Aluminoxanes are well known in the art and comprise oligomeric linear alkyl aluminoxanes generally believed to be represented by the formula:

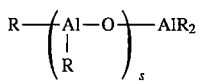

and oligomeric cyclic alkyl aluminoxanes of the formula:

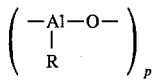

wherein s is 1–40, preferably 10–20; p is 3–40, preferably 3–20; and R is an alkyl group containing 1 to 12 carbon atoms, preferably methyl or an aryl radical such as a substituted or unsubstituted phenyl or naphthyl radical.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. The synthesis of methylaluminoxanes may also be achieved by the reaction of a trialkyl aluminum compound or a tetraalkyldialuminoxane containing C$_2$ or higher alkyl groups with water to form a polyalkyl aluminoxane, which is then reacted with trimethylaluminum. Further modified methylaluminoxanes, which contain both methyl groups and higher alkyl groups, may be synthesized by the reaction of a polyalkyl aluminoxane containing $C_2$ or higher alkyl groups with trimethylaluminum and then with water as disclosed in, for example, U.S. Pat. No. 5,041,584.

The amount of catalyst usefully employed in the catalyst composition may vary over a wide range. It is generally preferred to use the catalyst compositions at concentrations sufficient to provide at least about 0.000001, preferably about 0.00001 percent, by weight, of transition metal based on the weight of the monomers. The upper limit of the percentages is determined by a combination of catalyst activity and process economics. When the activating cocatalyst is a branched or cyclic oligomeric poly(hydrocarbylaluminum oxide), the mole ratio of aluminum atoms contained in the poly(hydrocarbylaluminum oxide) to transition metal atoms contained in the catalyst of the present invention is generally in the range of about 2:1 to about 100,000:1, preferably in the range of about 10:1 to about 10,000:1, and most preferably in the range of about 50:1 to about 2,000:1.

The catalyst composition may optionally contain one or more other polyolefin catalysts. These catalysts include, for example, any Ziegler-Natta catalysts containing a metal from groups IV(B), V(B), or VI(B) of the Periodic Table. Suitable activators for Ziegler-Natta catalysts are well known in the art and may also be included in the catalyst composition.

The catalyst composition may be supported or unsupported. In the case of a supported catalyst composition, the catalyst and the activating cocatalyst may be impregnated in or deposited on the surface of a substrate such as silicon dioxide, aluminum oxide, magnesium dichloride, polystyrene, polyethylene, polypropylene, or polycarbonate, such that the catalyst composition is between 0.01 and 90 percent by weight of the total weight of the catalyst composition and the support.

The support may first be impregnated with a hydrocarbon solution of the co-catalyst, dried of solvent followed by reimpregnation with the metal catalyst solution followed by solvent removal. Alternatively, the base support may be impregnated with the reaction product of the metal catalyst precursor and the co-catalyst followed by removal of the solvent. In either case, a hydrocarbon slurry of the supported, activated catalyst or a hydrocarbon-free powder results and these are used, usually without added activator as olefin polymerization catalysts. Frequently, an impurity scavenger is added to the reaction prior to or along with the catalyst-cocatalyst slurry/powder in order to maximize its activity.

Alternatively, the support can first be heated to drive off hydroxylic impurities notably water followed by reaction of the remaining hydroxyl groups with proton scavengers such as hydrocarbyl aluminum compounds (TMA, TEA, TIBAL, TNHAL, MAO, MMAO, etc.). Also, the heating may be omitted and the support reacted directly with the hydrocarbyl aluminum compounds.

It has also been found that the treatment of the catalyst system with an amine activator yields a catalyst with higher activities. By adding an amine to the catalyst precursor and then subsequently adding the cocatalyst the catalyst system yields higher activities than when no amine pretreatment occurs or when the amine treatment is added to the catalyst system containing both the precursor and cocatalyst. Indeed, this latter treatment has even yielded an inhibited catalyst system from an activity perspective. The level of amine addition ranges from 0.1 to 10 moles of amine per mole of transition metal, preferably from 1 to 5 moles amine per mole of transition metal. Suitable amines include, but are not limited to, ethyl amine, diethyl amine, triethyl amine, piperidine and the like.

Polymerization may be conducted in the gas phase in a stirred or fluidized bed reactor, or in a solution or slurry phase reactor using equipment and procedures well known in the art. Generally, the polymerization temperature ranges from about 0° C. to about 200° C. at atmospheric, subatmospheric or superatmospheric pressures. A slurry or solution polymerization process can utilize subatmospheric and superatmospheric pressures and temperatures in the range of about 40° C. to about 110° C. In the present invention, is preferred to utilize a gas phase polymerization process with superatmosheric pressures in the range of 1 to 1000 psi, preferably 50 to 400 psi and most preferably 100 to 300 psi, at temeratures in the range of 30° to 130° C., preferably 65° to 110° C. Ethylene, higher alpha-olefin(s), and optionally other monomers are contacted with an effective amount of catalyst composition at a temperature and a pressure sufficient to initiate polymerization. The process may be carried out in a single reactor or in two or more reactors in series. The process is conducted substantially in the absence of catalyst poisons such as materials have been found to affect the polymerization adversely. Organometallic compounds may be employed as scavenging agents for poisons to increase the catalyst activity. Examples of these compounds are metal alkyls, preferably aluminum alkyls, most preferably triisobutylaluminum.

Conventional adjuvants may be included in the process, provided they do not interfere with the operation of the catalyst composition in forming the desired polyolefin. Hydrogen can be used as a chain transfer agent in the process, in amounts up to about 10 moles of hydrogen per mole of total monomer feed.

Also, as desired for temperature control of the system, any gas inert to the catalyst composition and reactants can also be present in the gas stream.

Generally, the alpha-olefin monomers have from 2 to 12 carbon atoms and typically include, but not limited to, ethylene, propylene, 1-butene, 1-pentene, 4-methyl-1-pentene, 1-hexene, styrene, and the like. Preferred dienes which may optionally be polymerized with the alpha-olefins are those which are non-conjugated. These non-conjugated diene monomers may be straight chain, branched chain or cyclic hydrocarbon dienes having from about 5 to about 15 carbon atoms. Dienes which are especially preferred include 1,5-hexadiene, 5-vinyl-2-norbornene, 1,7-octadiene and the like.

Preferred aromatic compounds having vinyl unsaturation may be optionally polymerized with the alpha-olefins include styrene and substituted styrenes.

Polyolefins produced according to the invention can be polymers of one or more olefins. The polyolefins may also be derived from diolefins such as divinylbenzene, isoprene, linear terminal diolefins such as 1,7-octadiene, or olefins having one or more strained double bonds such as bicyclo (2.2.1) hepta-2,5-diene, 5-ethylidine-2-norbornene, 5-vinyl-2-norborene (endo and exo forms or mixtures thereof) and normal mono-olefins.

Catalyst additives may be introduced into the reaction zone as part of the catalyst system to modify reaction rates, such as Lewis bases. The Lewis bases which are applicable for use in the present invention and which are capable of reducing the activity of the olefin polymerization reaction as desired, even to the point of substantially complete termination, which is fully reversible, include ethers, alcohols, ketones, aldehydes, carboxylic acids, esters, carbonates, phosphines, phosphine oxides, phosphates, phosphites, amines, amides, nitriles, alkoxy silanes, aluminum alkoxides, water, oxygen, nitric oxides, and the like.

The Lewis base may be added to the polymerization reaction by a variety of methods, depending upon the polymerization process being used and the form of the Lewis base. It may be added in the neat form or it may be added as a dilute solution. Depending upon the solubility of the Lewis base, appropriate diluents may include the monomer or a hydrocarbon such as toluene or isopentane.

The amounts of Lewis base that is utilized to reduce the activity of the olefin polymerization reaction using a heteroallyl/aluminoxane catalyst system is strongly dependent upon a number of factors. Those factors include the specific Lewis base being used, the specific catalyst precursor compound that is present, the specific aluminoxane compound that is present, the reaction temperature, the molar ratio of aluminoxane to catalyst precursor, the specific olefin(s) that is(are) present, and the concentration of the olefin used in the polymerization reaction. Generally, if a multifunctional Lewis base is utilized to reduce the activity of the olefin polymerization, the extent of the reduction in polymerization activity will be greater than that observed with an equivalent amount of a monofunctional Lewis base. The amounts of Lewis base required to reduce the activity of a polymerization reaction will be less if a low aluminoxane catalyst precursor ratio is utilized.

The gas phase olefin polymerization reaction systems in which the present invention is useful comprise a reactor vessel to which olefin monomer and catalyst components can be added and which contain a bed of forming polyolefin particles. The present invention is not limited to any specific type of gas phase reaction system. In very general terms, a conventional fluidized bed process for producing resins is conducted by passing a gaseous stream containing one or more monomers continuously through a fluidized bed reactor under reaction conditions and in the presence of catalyst at a velocity sufficient to maintain the bed of solid particles in a suspended condition. The gaseous stream containing unreacted gaseous monomer is withdrawn from the reactor continuously, compressed, cooled and recycled into the reactor. Product is withdrawn from the reactor and make-up monomer is added to the recycle stream.

One of the liquid phase olefin polymerization reaction systems in which the present invention is useful is described in U.S. Pat. 3,324,095. The liquid phase olefin polymerization reaction systems generally comprise a reactor vessel to which olefin monomer and catalyst components can be added and which contains liquid reaction medium for dissolving or suspending the polyolefin. The liquid medium may consist of the bulk liquid monomer or an inert liquid hydrocarbon which is nonreactive under the polymerization conditions employed. While the hydrocarbon selected need not function as solvent for the catalyst or the polymers obtained by the process, it usually serves as solvent for the monomers employed in the polymerization. Among the inert hydrocarbon liquids suitable for this purpose may be mentioned isopentane, hexane, cyclohexane, heptane, benzene, toluene, and the like. The present invention is not limited to any specific type of solution, slurry, or bulk liquid monomer reaction system. In very general terms, a conventional liquid phase olefin process for producing resins is conducted by continuously adding one or more monomers to a reactor under reaction conditions in the presence of catalyst at a concentration sufficient to maintain the reaction medium in a fluid state. The reactive contact between the olefin monomer and the catalyst should be maintained by constant stirring or agitation of the reaction mixture. The reaction medium containing the polyolefin product and unreacted gaseous monomer is withdrawn from the reactor continuously. The polyolefin product is separated, then the unreacted monomer and liquid reaction medium are recycled into the reactor.

The invention further relates to a catalyst composition for the production of polyolefins, which comprises one of the above catalysts and an activating cocatalyst.

Finally, the invention provides a process for producing a polyolefin, which comprises contacting ethylene, higher alpha-olefins or mixtures thereof under polymerization conditions with a catalyst composition comprising one of the above catalysts and an activating cocatalyst, as well as polyolefins, particularly polyethylene, produced by this process.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

GLOSSARY

Density in g/cc is determined in accordance with ASTM 1505, based on ASTM D-1928, procedure C, plaque preparation. A plaque is made and conditioned for one hour at 100° C. to approach equilibrium crystallinity, measurement for density is then made in a density gradient column.

MAO is a solution of methyl aluminoxane in toluene, approximately 1.8 molar in aluminum, obtained from Ethyl Corporation (Baton Rouge, La.).

MMAO in isopentane is a solution of modified methyl aluminoxane containing isobutyl groups in isopentane, obtained from Akzo Nobel (Chicago, Ill.)

TMA is trimethylaluminum.

TEAL is triethylaluminum.

TIBA is triisobutylaluminum.

TNBAL is tri(n-butyl) aluminum.

MFR stands for melt flow ratio, which is the ratio of flow index to melt index. It is related to the molecular weight distribution of the polymer.

MI stands for melt index, reported as grams per 10 minutes, determined in accordance with ASTM D-1238, condition E, at 190° C.

FI stands for flow index, reported as grams per 10 minutes, is determined in accordance with ASTM D-1238, condition F, and is measured at ten times the weight used in the melt index text.

PROCEDURES

SEC-Viscometry for Long-Chain Branching Measurement

Polyethylene chains with long-chain branches show less-extended spatial conformational arrangements in a dilute solution than linear polyethylene chains of the same molar mass. Thus, the former have lower limiting viscosity numbers than the latter, due to their reduced hydrodynamic size. Theoretical relationships which permit calculation of long chain branching statistics from the ratio of limiting viscosity number of a branched polymer to that of its linear counterpart have been developed. See, for example, the article entitled "Determination of Long-Chain Branching Distributions of Polyethylenes," by Mirabella, F. M., Jr.; and Wild, L., in *Polymer Characterization, Amer. Chem. Soc. Syrup. Ser.* 227, 190, p. 23. Thus, measuring the limiting viscosity of polyethylene containing long chain branches as a function of molecular weight and comparing the results to the corresponding data measured for the same quantity of a linear polyethylene provides an estimate of the number of long chain branches in the branched polyethylene.

Determination of Molecular Weights, Molecular Weight Distribution, and Long Chain Branching A Waters 150-C liquid chromatograph equipped with gel permeation chromatograhic (GPC) columns for molecular weight measurements and a Viscotek 150R viscometer for viscosity measurements are employed. The gel permeation chromatograph provides the molecular weight distributions of the polyethylene samples, while the viscometer, along with the GPC infrared detector, measures the concentrations and determined viscosities. For the size exclusion chromatograhy (SEC), a 25 cm long preliminary column from Polymer Labs having a 50 Å nominal pore size, followed by a 25 cm long Shodex A-80 M/S (Showa) column with 80 Å nominal pore size, followed by a 25 cm long Shodex A-80 M/S (Showa) column with 80 Å nominal pore size are used. Both columns are of a styrene-divinyl benzene-like material. 1,2,4,-trichlorobenzene is used as the solvent and the chromatographic eluent. All measurements are made at a temperature of 140°±0.5° C. A detailed discussion of the methodology of the SEC-Viscometry technique and the equations used to convert GPC and viscometry data into long-chain branching and corrected molecular weights is given in the article by Mirabella and Wild referred to above.

Differential Scanning Colorimeter and Heat of Fusion

DSC thermogram is acquired by measuring the differential heat flow between sample and reference both placed in crimped aluminum pans using an increasing temperature ramp using a IA-2910 DSC controller and A21W data station.

Determination of Al, Zr and Si in Polyethylene

Polyethylene samples are weighed into platinum crucibles, ignited, then placed in a muffle furnace (580° C.) until all the carbon has burned off. After cooling hydrochloric acid is added to the residue and it is heated gently to aid dissolution. The crucibles are cooled, and hydrofluoric acid is added to insure total dissolution of the silicane. The samples are then quantitatively transfered and diluted to 15 ml with deionized water and analyzed using an Inductively-Coupled Plasma (Atom Scan 25, Thermo Jarrell Ash).

Ethylene Copolymer Composition Distribution Analysis by Temperature Rising Elution Fractionation Temperature Rising Elution Fractionation or TREF has been established as a primary method for measuring composition (or short-chain branch) distribution for ethylene/alpha-olefin copolymers. A dilute copolymer solution in a solvent such as 1,2,4-trichlorobenzene, at 0.1–0.5% w/v, is loaded at high temperature onto a packed column. The column is then allowed to cool down to ambient temperature in a controlled manner so that the polymer is crystallized onto the packing in the order of increasing branching (or decreasing crystallinity) with the decreasing temperature. The column is then heated in a controlled manner to above 140° C. with a constant solvent flow through the column. The polymer fractions as they are eluted have decreasing branching (or increasing crystallinity) with the increasing temperature. A concentration detector is used to monitor effluent concentrations. Profiling the concentration of the polymer as a function of elution temperature yields a so-called TREF thermogram.

Reference: Wild, L. et al., *J. Polym. Sci., Polym. Phys. Ed.*, 20, p. 441 (1982).

Branching by Carbon-13 NMR

An 8% weight/volume concentration is prepared by dissolving the polyolefin in ortho dichlorobenzene (ODCB) in an NMR tube. A closed capillary tube of deuterium oxide is inserted into the NMR tube as a field frequency lock. Data is collected on the Bruker AC 300 at 115° C. using NOE enhanced conditions with a 30° PW and a 5 second repetition time. The number of carbon scans usually varies from 1,000 to 10,000 with the more highly branched samples requiring shorter acquisitions. The area of each of the peaks is measured along with the area of the total aliphatic region. The areas of the carbons contributed by the comonomer are averaged and rationed to the area of the backbone to give the mole fraction. This number is then converted into branch frequency.

Method for the Determination of Unsaturation in Polyethylene by IR

The CH out-of-plane band of unsaturated group is sensitive to the nature of substitution on the double bond. It is, therefore, possible to distinguish between three different types of unsaturation: vinyl (910 cm$^{-1}$), vinylidene (890 cm$^{-1}$) and trans-vinylene (965 cm$^{-1}$) absorptions; however, cis-vinylene is not measurable due to interference of the $CH_2$ wagging vibrations at 720 cm$^{-1}$. The total degree of unsaturation is determined by summing all the three above.

The procedure makes use of the following equation for branching frequency per 1,000 $CH_2$ groups (BF):

$$BF = [A/te] * [14.0/2.54 \times 10^{-3}]$$

where A is the peak height in absorbance units, t is thickness in mils, e is extinction coefficient in liter/cm *mol. The values of the extinction coefficients were taken from the work of Anderson and Seyfreid (1). Bromination procedure (2) is used to eliminate interference from butyl branches. This involved using the brominated films as references.

References:
1. J. A. Anderson and W. D. Seyfreid, *Anal. Chem.* 20, 998 (1948).
2. D. R. Rueda, F. J. Balta-Calleeja, and A. Hidalgo, *Spectrochim. Acta* 30 A, 1545 (1974).

Slurry Polymerization Techniques

The stirring slurry polymerizations are carried out in a stirred reactor of 1750 ml volume. The hexane charge is 1000 ml. Hexene-1 charged (when used) is either 60 or 100 ml. The hydrogen is dosed by filling a ¼" or ⅜" tubing of variable length, but accurately known volume, to 200 psi with hydrogen, and discharging this into the reactor (at ~atm. press.). All gases ($N_2$, ethylene, hydrogen) are run through molecular sieves and deoxy columns. Hexane is dried with molecular sieves and deoxygenated by slowly bubbling nitrogen through it for about 0.5 hr. Manipulation(s) of the catalyst components are carried out in a dry box (~0.2 ppm $O_2$ and or ~0.2 ppm water).

1000 ml $N_2$-purged hexanes are transferred to the reactor (which had been baked out under an $N_2$ stream for 0.5 hr at 100° C.). Then, the hexene-1 (95$^+$%, $Al_2O_3$ treated kept under $N_2$) is added via a syringe if used as comonomer.

The hexane, hexene-1 are brought to 65° C. and then pressured to 200 psi with ethylene. Then the catalyst is injected into the reactor under 200 psi pressure. At the end of the copolymerization, about 2 ml i-propanol plus Ionol (2,6-di-tert, butyl p-cresol) are injected at 200 psi followed by ethylene venting. This procedure allows copolymerization to proceed only under the desired conditions: 100 ml hexene-1, etc., plus 200 psi ethylene.

Mechanically Stirred, Gas Phase Reactor Polymerization Procedure

Before each batch run, a pre-bed is charged to the reactor and then pressure-purged with nitrogen three times to 100 psig. Jacket temperature is adjusted to hold the material at approximately 80° C. overnight while under a 3–4 lb/hr nitrogen flow purge at 100 psig reactor pressure. Prior to the run, the reactor is pressure purged once to 300 psi and then 50 ml of cocatalyst solution are then charged to further passivate the reactor. The reactor is then pressure purged 4 more times to 100 psig. Raw materials are charged to establish the initial gas phase concentrations of ethylene, hexene, and nitrogen; gas-phase concentrations are normally held near these initial values throughout the batch.

Catalyst slurry or solution is fed to the reactor continuously during the polymerization using aluminum alkyl cocatalyst solution as a carrier and nitrogen as a dispersant. Catalyst feed rate is then adjusted as required to maintain polymerization rates of 5–7 lbs/hr.

Monomers and hydrogen are fed continuously as required to maintain gas phase composition throughout the batch. A small vent stream is used to prevent accumulation of the nitrogen that is added with the catalyst. The reactor is operated in batch mode, whereby the batch is terminated when the bed weight approached 25–30 lbs. At batch termination, the feeds are shut off and the reactor is rapidly vented to atmospheric pressure. The reactor is then pressure purged five times to 100 psi with dry nitrogen. The resin is then discharged into the product box, exposed to the atmosphere. Once in the box, a two-nozzle purging manifold is inserted deep into the resin in order to purge it out with water-saturated nitrogen overnight at ambient temperature.

If hydrogen is used as the chain terminator then the following procedure is employed: The hexane-catalyst solution at 65° is pressurized with 25 psi of ethylene and allowed to react for 5 min. to initiate the polymerization reaction. The ethylene is then vented and the hydrogen dosed into the closed reactor. Then 200 psi ethylene is added which initiated a vigorous polymerization reaction (exotherm).

EXAMPLES

Reaction of Indene and Zirconium Tetra(Diethylamide) and Isolation of Reaction Product Indene (0.480 g, 4.14 mmole) and zirconium tetra(diethylamide) (0.650 g, 1.72 mmole) were reacted at 86° for 1.5 hour under nitrogen. The reaction product was subject to distillation at 165°/0.02 mm Hg, yielding a clear yellow, viscous liquid.

Mass spectroscopy showed parent ions at about 421 M/Z (several peaks due to the Zr isotopes). The cracking pattern was as expected from this molecule. The $^{13}$C-NMR (in $d_8$-dioxane) showed a series of aromatic resonances in the ratio of 2:2:2:1, plus ethyl multiplets $CH_2(-12)$, $CH_3(-18)$. This establishes the structure:

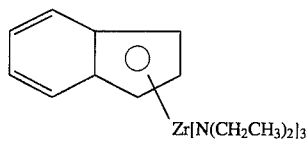

Comp. Example A

When the above distilled product was not reacted with $CO_2$, but with MMAO and polymerization was carried out in the stirred slurry reactor this catalyst had an activity of 1800 gPE/hr-mmole Zr-100 psi ethylene at 65°, 200 psi ethylene, 1000 ml hexane, 2.0 mmole Zr, Al/Zr=1000 (mole ratio).

Example 1

The above distilled product was reacted with $CO_2$ (atm. press, 3 $CO_2$/Zr) for 1 hour followed by reaction with MMAO for 1 hour.

In the stirred slurry reactor this catalyst had an activity of 24,400 gPE/hr-mmole Zr-100 psi ethylene at 65°, 200 psi ethylene, 1000 ml hexane, 2.0 mmole Zr, Al/Zr=1000 (mole ratio).

The activity of these carbamate catalysts, after reaction with MMAO was found to be time dependent as reported in Table 1.

TABLE 1

Ethylene Polymerizations Using Purified $\eta^5$-Indenyl Tris(Diethylamide) as Catalyst Precursor

| Run No.[a] | A | B | C | D | E | F |
| --- | --- | --- | --- | --- | --- | --- |
| $CO_2$/Zr (mole) | 0 | 3 | 3 | 3 | 3 | 3 |
| $CO_2$ Treatment[b] Time | 0 | 1 hr | 5 min | 24 hr | 24 hr | 2 hr |
| MMAO Treatment[c] Time | 0 | 1 hr | 5 min. | 1 hr | 54 hr | 0.5 hr |
| Activity (g PE/hr · mmol Zr · 100 psi) | 1,800 | 24,400 | 5,400 | 22,800 | 7,400 | 11,200 |

[a]200 psi ethylene, 65°, ~2 mmole Zr, Al/Zr ~ 1000, no $H_2$ or hexene-1.
[b]Atmospheric pressure addition of $CO_2$, time in contact with $CO_2$ until sample taken for MMAO reaction.
[c]Time for reaction of carbamate with MMAO solution.

Example 2

Preparation of $\eta^5$-Indenyl Tris(Diethylamide)

Indene (98%, Aldrich, 0.129 mole) was mixed with 24.8 g. zirconium tetra(diethylamide) (0.0654 mole). This was heated for 1 hr. under $N_2$, at 115°–118° cooled and vacuum applied (0.01 mm Hg, 40°) in order to remove volatiles. 4.3 g, 90.2% of theory for 0.0654 mole diethylamine (b. pt. 55°) were pumped off. The $^{13}$C-NMR (soln. in $d_8$-dioxane), shows approximately equal mixtures of unreacted indene (used ~200% excess) and the expected reaction product.

Reaction With Carbon Dioxide to Form $\eta^5$-Indenyl Tris(diethylcarbamate)

Low Pressure Method

In the drybox, 0.303 g of the above reaction product were weighed into a 100 ml septum-sealed glass container (0.5 15 mmole Zr) and diluted with 30 ml $N_2$ purged hexanes. External to the drybox and with good magnetic stirring, 40.5 ml $CO_2$ (1.81 mmole $CO_2$; 3.3 $CO_2/Zr$) were added at room temperature, stirred for 2 hr and the product returned to the drybox. This solution had approximately 18.5 mmol Zr/ml.

In the stirred slurry reactor this catalyst had an activity of 34,700 g PE/hr-mmole Zr-100 psi ethylene at 65°, 200 psi ethylene, 1000 ml hexane, 1.5 mmole Zr; Al/Zr=1000 (mole ratio).

The variation of the catalyst's activity with $CO_2/Zr$ ratio is illustrated in Table 2. Effect of added H2 is reported in Table 3. The effect of the Al/Zr ratio is reported in Table 4.

TABLE 2

Ethylene Hexene-1 Copolymerization with Carbon Dioxide-Treated Zirconium Tetra(Diethylamide)-Indene-MMAO Catalysts[a]

| Run No. | G | H | I | J |
|---|---|---|---|---|
| $CO_2/Zr$ (mole) | 0 | 1 | 2 | 3 |
| Activity | | | | |
| (g PE/hr · mmole Zr · 100 psi ethylene) | 9,700 | 32,200 | 30,100 | 33,800 |
| FI[c] | NF | NF | NF | 1.15 |
| BBF | —[b] | 10.5 | 15.6 | 13.3 |
| Hexene-1 (wt. %) | — | 6.1 | 8.8 | 7.6 |
| SEC | | | | Monomodal PDI-4.3 |
| Mol. Wt. (Wt. Ave.) | | | | 227,000 |
| No. Ave. | | | | 52,400 |

[a]Under standard condition but including 100 ml hexene-1. Catalyst prepared as Expl. C.
[b]w/o hexene-1.
[c]NF = No Flow.

TABLE 3

Effect of Added Hydrogen on the Ethylene-Hexene-1 Copolymerization[a,b]

| Run No. | K | L | M | N |
|---|---|---|---|---|
| Hydrogen (ml STP) | 0 | 63 | 126 | 252 |
| Activity | | | | |
| (g PE/hr · mmole Zr · 100 psi ethylene=) | 32,200 | 90,800 | 24,900 | 29,400 |
| Polymer Properties | | | | |
| FI | NF | 1.0 | 14.8 | 15.5 |
| MFR | — | 28.9 | — | — |
| BBF | 10.5 | 10.3 | 8.7 | — |
| Hexene-1 (wt. %) | 6.1 | 5.9 | 5.0 | — |
| SEC | | | | |
| Mol. Wt.; Wt. Avc. | — | 109,000 | 52,600 | — |
| Mol. Wt.; No. Ave. | — | 23,900 | 11,900 | — |
| PDI | — | 4.6 | 4.4 | — |
| Shape of Curve | — | Possibly Bimodal | Possibly Bimodal | — |

TABLE 3-continued

Effect of Added Hydrogen on the Ethylene-Hexene-1 Copolymerization[a,b]

| Run No. | K | L | M | N |
|---|---|---|---|---|
| DSC | | | | |
| M. pt. (°C.) | — | 121.9/121.7 | 120.3/119.9 | — |
| $\Delta H_f$ (cal/g) | — | 40.5/37.4 | 38.1/32.3 | — |

[a]Catalyst preparation Expl. C.
[b]Polymerization under standard conditions but including 100 ml hexene-1 plus hydrogen as indicated.

TABLE 4

Effect of Al/Zr Ratio on Catalytic Activity[a,b]

| Run No. | O | P | Q | R |
|---|---|---|---|---|
| Al/Zr (mole) | 1000 | 500 | 250 | 125 |
| Activity | | | | |
| (g PE/hr · mmole Zr · 100 psi ethylene) | 31,400 | 23,700 | 13,400 | 2,200 |
| BBF ($C_4$'s/1000 $CH_2$'s) | 10.2 | — | 7.5 | — |
| Hexene-1 (wt. %) | 5.9 | — | 4.4 | — |
| FI | 2.0 | — | — | — |

[a]Catalyst precursor was reacted with variable amounts of MMAO as per Expl. B.
[b]Polymerization carried out under standard conditions except 100 ml of hexene-1 were added.

Example 3

High Pressure Method

In the drybox, 1.174 g of the reaction product taken from the first part of Example 2 was placed into a 10 ml Hoke cylinder along with 3.24 g of $N_2$ purged toluene. The valves on the cylinder were closed and the assembly connected to a $CO_2$ cylinder ("Bone Dry" $CO_2$) and 60 psi $CO_2$ pressure applied for 1¼ hr. This rapidly resulted in an exotherm (~40°+). The cylinder was opened and carefully washed out with toluene and the bright yellow solution diluted to 50 ml (~43 mmole Zr/ml) with toluene.

In the stirred slurry reactor the above catalyst had an activity of 48,000 g PE/hr-mmole Zr-100 psi ethylene at 85°, 200 psi ethylene, 1000 ml hexane, 100 ml hexene-1, 120 ml (STP) hydrogen, 1.6 mmole Zr, Al/Zr=1000 (mole ratio).

Example 4

Reaction of Bis(Indenyl) Ethane with Zirconium Tetra(Diethylamide)

In a drybox 0.270 g bis(indenyl) ethane (1.047 mmole) and 0.395 g zirconium tetra(diethylamide (1.042 mmole) were weighed into a sealed glass reactor. This was heated to 120° for 1¼ hour under nitrogen (the solution turned clear at about 115°). This was cooled and evacuated at room temperature, for 0.5 hour (0.3 mm Hg). The weight loss was 0.983 g corresponding to a theoretical 1.285 mmole diethylamine. The residue was dissolved in 25 ml $N_2$-purged hexanes.

2.5 ml of the above hexane solution (100 mmole Zr) were added to a 25 ml septum stoppered vial and 6.7 ml gaseous carbon dioxide added (3.0 $CO_2/Zr$, 300 mmole $CO_2$) at room temperature and ambient pressure. This was allowed to react for several hours with good stirring; the clear solution turned from yellow to green-yellow.

MMAO (5.0 ml heptane solution 11.25 mmole Al), were reacted with 0.25 ml of above carbamate solution (10.5 mmole Zr) resulting in a solution having an Al/Zr-1000; 2 mmole Zr/ml. This was used after 1 hour but before 6 hours for polymerization studies.

In the stirred slurry reactor this catalyst had an activity of 15,800 g PE/hr-mmole Zr-100 psi ethylene at 65°, 200 psi ethylene, 1000 ml hexane, 2.0 mmole Zr, Al/Zr=1000 (mole ratio).

Example 5

Preparation of Bis(Indenyl)Ethane Zirconium Tris(Diethyl-amide) Reaction Product Bis(indenyl)ethane (0.327 g, 1.27 mmole) were reacted with zirconium tetra(diethyl amide) (1.025 g, 2.70 mmole, 6% excess for 1:2 stoichiometry) at 125° C. for 2½ hours under nitrogen. This resulted in a light orange-yellow oil: 0.427 g of it were dissolved in 25 ml hexanes (46.1 mmole Zr/ml).

Preparation of Bis(Indenyl)Ethane Zirconium Tris(Diethyl-carbamate)

The above hexane solution of the trisdiethylamide was reacted with 80 psi $CO_2$ at room temperature for 1 hour and atmospheric pressure forming the carbamate.

In the stirred slurry reactor this catalyst had an activity of 68,200 g PE/hr-mmole Zro100 psi ethylene at 65°, 200 psi ethylene, 1000 ml hexane, 100 ml hexene-1, 2.0 mmole Zr, Al/Zr=1000 (mole ratio). The polymer product had a BBF of 14.2.

Example 6

Preparation of Catalyst From Above Carbamate 0.31 ml of the carbamate solution from Example 5 (10.5 mmole Zr) was mixed with 5.0 ml (10.5 mmole) MMAO solution yielding a light yellow, clear solution. It was used after I hour standing at room temperature. In the stirred slurry reactor this catalyst had an activity of 49,400 g PE/hr-mmole Zr-100 psi ethylene at 65°, 200 psi ethylene, 1000 ml hexane, 100 ml hexene-1, 2.0 mmole Zr, Al/Zr= 1000 (mole ratio). The polymer product had a BBF of 20.9.

The effect of the mode of $CO_2$ addition on the catalyst's activity is reported in Table 5.

The substitution of other heterocumulenes for $CO_2$ for the reaction with the bis(indenyl)ethane bis[zirconium tris( diethylamide)] is reported in Table 6.

The effect of hexene-1 concentration on the activity and polymer properties is reported in Table 7.

TABLE 5

Miscellaneous Hexene-1-Copolymerizations with Bis(Indenyl)Ethane Bis[zirconium Tris(Diethylamide)] Derived Catalysts[a]

| Run | S | T | U |
|---|---|---|---|
| | None | 3 $CO_2$ Zr atm. press. | $CO_2$ 80 psi $CO_2$ |
| Activity (g PE/hr · mmole Zr · 100 psi) | 3,200 | 49,400 | 68,200 |
| BBF | | | |
| (Butyl branches/1000 $CH_2$'s) | 12.9 | 20.9 | 14.2 |
| FI | NA | 5.0 | NA |
| MFR | | 18.9 | |
| SEC-PDI | NA | 2.1 | NA |
| Mw | | 58,400 | |

[a]Under standard polymerization conditions using 100 ml hexene-1 and catalyst prepared according to the Expl. I, J, or K.

TABLE 6

Effect of Heterocumulenes on the Bis(Indenyl)Ethane-Bis[Zirconium Tris(Diethylamide)] based Catalyst[a]

| Polymerization Run | V | X | Y | Z | AA | BB[b] | CC[b] |
|---|---|---|---|---|---|---|---|
| Additive | 3 $CO_2$/Zr | 2 $CS_2$/Zr | 3 COS / Zr | 2 Bu NCO / Zr | 3(Cy—N=)$_2$C[c] | Æ | 3 $SO_2$ / Zr |
| Zr (mmole) | 3.1 | 3.0 | 3.2 | 0.47 | 0.48 | 3.4 | 2.0 |
| Hexene-1 (ml) | 0 | 0 | 0 | 0 | 0 | 100 | 100 |
| Activity (g PE/hr · mmol Zr · 100 psi ethylene) | 15,800 | 630 | 2,620 | 18,900 | 13,500 | 11,100 | 20,000 |
| BBF | — | — | — | — | — | 10.7 | 13.5 |
| Hexene (wt. %) | — | — | — | — | — | 6.2 | — |
| FI | | | | | | — | 1.9 |

[a]Catalysts prepared similar to Expl. U except appropriate heterocumulene was substituted. Polymerizations under standard conditions.
[b]Plus 100 ml hexene-1.
[c]Dicyclohexylcarbodiimide: $C_6H_{11}N=C=NC_6H_{11}$.

TABLE 7

Effect of Hexene-1/Hexene Ratio on Copolymerization Characteristics of The Bis(Indenyl) Ethane-Bis[Zirconium Tris(Diethylcarbamate)] Catalyst[a]

| Run | DD | EE | FF |
|---|---|---|---|
| Hexene-1 Concentration (wt. % in hexenes) | 9.1 | 16.8 | 28.6 |
| Catalytic Activity | | | |
| (g PE/hr · mmole Zr · 100 psi ethylene) | 29,700 | 15,400 | 1.560 |
| BBF ($C_4$'s/1000 $CH_2$'s) | 12.6 | 21.5 | 36.4 |
| Hexene-1 (wt. %) | 7.2 | 11.9 | 19.1 |

[a]Catalyst prepared as in Expl. U. Standard polymerization conditions except variable amounts of hexene-1 added (100, 200, 300 ml).

The catalysts prepared above were run in a stirred gas-phase reactor in the manner discussed below and under the conditions reported in Table 11 using both supported and solution feed of the $\eta^5$-indenyl zirconium tris(diethylcarbamate) and the bis($\eta^5,\eta^{5'}$-indenyl)ethane bis[zirconium-tris(diethyl carbamate)] catalysts. A summary of the product properties is reported in Table 11.

Polymerization Procedure in Horizontally Mixed Reactor

In Runs A through G (Table 11), polyethylenes and hexene-1 copolymers were prepared in a horizontally mixed reactor with various metallocene catalyst solutions. The reactor used was a two-phase (gas/solid) stirred bed, backmixed reactor. A set of four "plows" 100 were mounted horizontally on a central shaft rotating at 200 rpm to keep the particles in reactor 110 mechanically fluidized. The reactor cylinder swept by these plows measured 40.6 cm (16 in) long by 39.7 cm (15.6 in) in diameter, resulting in a mechanically fluidizable volume of 46 liters (1.6 ft$^3$). The gas volume, larger than the mechanically fluidizable volume due to the vertical cylindrical chamber, totaled 54.6 liters (1.93 ft$^3$). A disengager vessel 120 was mounted atop reactor 110. This vessel had a gas volume of 68 liters (2.41 ft$^3$), more than doubling the gas volume of the reactor. Gas was continually recirculated through both the reactor and disengager via a blower 130, so that the gas composition was homogeneous throughout.

The reactor pressure used was typically 300–400 psig (2 to 4 MPa) and in the reported examples was 2.41 MPa except where otherwise noted in Table 11. Monomers and hydrogen (for molecular weight control) were fed to the reactor continuously via control valves through line 140. Partial pressures of monomer ranged typically between 150–300 psi. Comonomer (if any) was introduced via control valves through line 150 and vaporized 160 and its content in the polymer was controlled by adjusting feed rates to maintain a constant comonomer/monomer molar ratio in the gas phase. Gas composition was measured at 4–6 minute intervals by a gas chromatographic analyzer. Molecular weight of the polymer was controlled by adjusting hydrogen feed rate to maintain a constant mole ratio of hydrogen to monomer in the gas phase. Nitrogen made up the majority of the balance of the composition of the gas, entering with the catalyst through line 170 and leaving via a small vent 180 with the reactor gases including volatilized solvents. The vent opening was adjusted via computer to maintain constant total pressure in the reactor.

The reactor was cooled by an external jacket of chilled glycol. The bed temperature was measured with a temperature probe in a thermowell protruding into the bed at a 60° angle below horizontal, between the inner set of plows. Reactor temperatures were controlled to values.

Catalyst solutions were prepared by mixing one or more metallocenes and storing the resulting solutions in a reservoir connected to line 190. Solution catalyst is metered in shots via line 190 and mixed with a continuous stream of methylaluminoxane co-catalyst solution introduced via line 200. In the experiments reported below, MMAO in isopentane was used; the concentration of MMAO was 7.23% and the amount of the cocatalyst used was such that the Al/Zr ratio in the reactor was 1000. This mixture is fed through a coil 210 of ⅛" tubing where the components react for typically ~25 minutes. Upon leaving this precontact coil, the mixed solution feed is sprayed into the reactor by a constant flow of nitrogen. This spray can be directed into the bed or above the bed, as desired.

Typical batch yields of granular polymer in this reactor are 20–25 lbs, with 30–35 lbs being the upper limit. Batch runs typically last 3–6 hours. Alternatively, the reactor can be run in continuous mode, in which granular polymer is withdrawn at 220 in typically 0.4 lb portions while the polymerization is in progress. In the continuous mode, the product discharge system is enabled after the bed weight builds to typically 15–25 lbs, and the rate of discharge is altered to maintain constant bed weight.

A typical run commences with monomers being charged to the reactor and feeds adjusted until the desired gas composition is reached. An initial charge of cocatalyst is added prior to starting catalyst feeding in order to scavenge any poisons present in the reactor. After catalyst feed starts, monomers are added to the reactor sufficient to maintain gas concentrations and ratios. As the catalyst inventory builds up, polymer production rate increases to 5–10 lbs/hr, at which point catalyst feed is adjusted to maintain constant polymer production rate. Cocatalyst feed rate is maintained in proportion to the catalyst feed rate. If a long-lived catalyst, such as a heteroallyl complex, is used, the catalyst and cocatalyst feeds can be turned off well before the batch weight target is achieved, since sufficient activity is often retained to continue polymerization for may hours. After the desired batch weight is made, the reactor is quickly vented, and monomer are purged from the resin with nitrogen. The batch is then discharged through valve 220 to the open atmosphere.

In Runs H through L, the polymerization reactions were carried out in a 100 ml reactor under slightly different conditions. Ethylenehexene copolymerizations were performed under 85 psi ethylene in a 1 L stirred reactor at 75° C. The reactor was charged with 600 mL hexane, 46 mL hexene and MMAO (500 equiv. based on Zr), followed by a toluene solution containing catalyst (1 mmole) and 500 mmole of MMAO. Polymerizations were performed for 30 minutes.

Example 7

Synthesis of (Ind)Zr(NMe$_2$)$_3$

Indene (1.11 g, 9.54 mmole) and Zr(NMe$_2$)$_4$ (2.16 mg, 9.54 mmol) were to a mL Schlenk tube and heated under nitrogen for 1 hour at 110° C. The solution was cooled to room temperature and volatile materials were removed under vacuum. The resulting oil was determined to be (Ind)Zr(NMe$_2$)$_3$ by $^1$H NMR analysis. $^1$H NMR (C$_6$D$_6$) d 7.50 (AA'BB', indenyl, 2H), 6.92 (AA'BB', indenyl, 2H), 6.43 (t, J=3.0 Hz, 2-indenyl, 1H), 6.23 (d, J=3.0 Hz, 1-indenyl, 2H), 2.77 (s, CH$_3$, 18H).

Copolymerization with (Ind)Zr(O$_2$CNMe$_2$)$_3$ (Ind)Zr(NMe2)3 (40 mg) was placed in a test tube and dissolved in 2.0 mL of benzene-d6. The tube was pressurized to 50 psi CO$_2$ and stirred for 5 min. $^1$H and $^{13}$C NMR analysis of the solution indicated clean conversion to (Ind)Zr(O$_2$CNMe$_2$)$_3$. $^1$H NMR (C$_6$D$_6$) d 7.57 (AA'BB', indenyl, 2H), 7.00 (AA'BB', indendyl, 2H), 6.98 (t, J=3.3 Hz, 2-indenyl, 1H), 6.42 (d, J=3.3 Hz, 1-indenyl, 2H), 2.39 (br s, CH$_3$, 18H). $^{13}$C{$^1$H} NMR (C$_6$D$_6$) d 170.25 (carbonyl), 127.23, 124.37, 123.81, 120.08, 104.21, 34.09 (methyl).

An aliquot of the solution was diluted in toluene, and 1 mmole was used for ethylene-hexene copolymerization with MMAO. An activity of 62,800 g PE/mmol Zr/100 psi/hr was observed at 75° C. GPC analysis indicated M$_w$=178,000 and M$_n$=52,300 for a PDI of 3.41.

Example 8

Synthesis of (Ind)Zr(piperidide)$_3$

Indene (1.78 g, 15.3 mmole) and Zr(piperidide)$_4$ (738 mg, 1.72 mmole) were charged to a 25 mL Schlenk tube and heated under nitrogen for 2 hours at 138° C. The solution was cooled to room temperature and volatile materials were removed under vacuum. The resulting oil was determined to be (Ind)Zr(piperidide)$_3$ by $^1$H NMR analysis. $^1$H NMR (THF-d$_8$) d 7.61 (AA'BB', indenyl, 2H), 6.98 (AA'BB', indenyl, 2H) 6.63 (t, J=3.3 Hz, 2-indenyl, 1H), 6.36 (d, J=3.0 Hz, 1-indenyl, 2H), 3.15 (m, piperidide 2-CH$_2$, 12 H), 1.44 (m, piperidide 4-CH$_2$, 6H), 1.35 (m, piperidide 2-CH$_2$, 12H).

Copolymerization with (Ind)Zr(O$_2$Cpiperidide)$_3$ (Ind)Zr(piperidide)$_3$ (109 mg) was placed in a test tube and dissolved in 2.0 mL of benzene-d$_6$. The tube was pressurized to 50 psi CO$_2$ and stirred for 5 min. $^1$H and $^{13}$C NMR analysis of the solution indicated clean conversion to (Ind)Zr(piperidide)$_3$. $^1$H NMR (C$_6$D$_6$) d 7.64 (AA'BB', indenyl, 2H), 7.04 (t, J=3.3 Hz, 2-indenyl, 1H), 6.70 (d, J=3.3 Hz, 1-indenyl, 2H), 2.39 (br s, CH$_3$, 18 H). $^{13}$C{$^1$H} NMR (C6D6) d 170.25 (carbonyl), 127.23, 124.37, 123.81, 120.08, 104.21, 34.09 (methyl).

An aliquot of the solution was diluted in toluene, and 1 mmole was used for ethylene-hexene copolymerization with MMAO. An activity of 155,000 g PE/mmole Zr/100 psi/hr was observed at 75° C. GPC analysis indicated M$_w$=186,000 and M$_n$=54,100 for a PDI of 3.44.

Example 9

Synthesis of (MeC$_5$H$_4$)Zr(NEt$_2$)$_3$

Freshly cracked methylcyclopentadiene (0.806 g, 10.08 mmole) and Zr(NEt$_2$)$_4$ (3.74 g, 9.84 mmole) were charged to a 25 mL Schlenk tube and heated under nitrogen for 30 minutes at 90° C. The solution was cooled to room temperature and volatile materials were removed under vacuum. The resulting oil was determined to be (MeC$_5$H$_4$)Zr(NEt$_2$)$_3$ by $^1$H NMR analysis.

Copolymerization with (MeC$_5$H$_4$)Zr(O$_2$CNEt$_2$)$_3$ (MeC$_5$H$_4$)Zr(NEt$_2$)$_3$ (110 mg) was placed in a test tube and dissolved in 2.0 mL of toluene-d$_8$. The tube was pressurized to 50 psi CO$_2$ and stirred for 5 minutes. $^1$H and $^{13}$C NMR analysis of the solution indicated clean conversion to (MeC$_5$H$_4$)Zr(O$_2$CNEt$_2$)$_3$. $^1$H NMR (toluene-d$_8$) d 6.37 (virtual t, Cp CH$_2$, 2H), 6.08 (virtual t, Cp CH$_2$, 2H), 3.01 (q, CH$_2$CH$_3$, 6H), 2.35 (s, C5H$_4$CH$_3$, 3H), 0.85 (t, CH$_2$CH$_3$, 9H). $^{13}$C{1H} NMR (toluene-d$_8$) d 169.83 (carbonyl), 125.96, 115.15, 114.16 (C$_5$H$_4$Me), 39.66 (MeCp), 14.01 (CH$_2$CH$_3$), 13.64 (CH$_2$CH$_3$).

An aliquot of the solution was diluted in toluene, and 1 mmole was used for ethylene-hexene copolymerization with MMAO. An activity of 24,800 g PE/mmole Zr/100 psi/hr was observed at 75° C.

Example 10

Synthesis of (Cp)Zr(NEt$_2$)$_3$

Freshly cracked cyclopentadiene (488 mg, 7.38 mmole) and Zr(NEt$_2$)$_4$ (2.78 g, 7.32 mmole) were charged to a 25 mL Schlenk tube and heated under nitrogen for 18 h at 25° C. The solution was cooled to room temperature and volatile materials were removed under vacuum. Vacuum distillation of the residue (155° C./0.1 mm Hg) gave a yellow oil which was determined to be CpZr(NEt$_2$)$_3$ by $^1$H NMR analysis. $^1$H NMR (THF-d$_8$) d 6.19 (s, Cp, 5H), 3.27 (q, CH$_2$CH$_3$, 12H), 0.99 (t, CH$_2$CH$_3$, 18H).

Copolymerization with (Cp)Zr(O$_2$CNEt$_2$)$_3$ (Cp)Zr(NEt$_2$)$_3$ was placed in a test tube and dissolved in benzene-d$_6$. The tube was pressurized to 50 psi CO$_2$ and stirred for 5 minutes. $^1$H and $^{13}$C NMR analysis of the solution indicated clean conversion to (Cp)Zr(O$_2$CNEt$_2$)$_3$. $^1$H NMR (C$_6$D$_6$) d 6.51 (s, Cp, 5H), 3.00 (br m, CH$_2$CH$_3$, 12H), 0.88 (t, CH$_2$CH$_3$, 18H). $^{13}$C{1H} NMR d 166.50 (carbonyl), 114.62 (Cp), 39.67 (CH$_2$CH$_3$), 13.99 (CH$_2$CH$_3$).

An aliquot of the solution was diluted in toluene, and 1 mmole was used for ethylene-hexene copolymerization with MMAO. An activity of 8100 g PE/mmole Zr/100 psi/hr was observed at 75° C.

Example 11

Synthesis of (Ind)Zr(O$_2$CCMe$_3$)$_3$ (Ind)Zr(NEt2)3 (37 mg, 0.088 mmole) was dissolved in 1.0 mL of benzeneod6. A solution of pivalic acid (27 mg, 0.26 mmole) in 1.0 mL benzene-d6 was added with stirring. 1H NMR exhibited resonances assigned to NEt$_2$H and (Ind)Zr(O$_2$CCMe$_3$)$_3$. $^1$H NMR (C$_6$D$_6$) d 7.41 (AA'BB', indenyl, 2H), 6.95 (AA'BB', indenyl, 2H), 6.74 (t, J=3.3 Hz, 2-indenyl, 1H), 6.39 (d, J=3.3 Hz, 1-indenyl, 2H), 1.10 (s, CH$_3$, 27H).

Copolymerization with (Ind)Zr(O$_2$CCMe$_3$)$_3$

An aliquot of the benzene-d6 solution of (Ind)Zr(O2CCMe3)3 was diluted in toluene, and 1 mmole was used for ethylene-hexene copolymerization with MMAO. The yield of copolymer was 47.2 g which indicated an activity of 111,000 g PE/mmole Zr/100 psi/hr at 75° C. GPC analysis indicated M$_w$=142,000 and M$_n$=46,500 for a PDI of 3.05. Hexene incorporation (12 butyls/1000 CH$_2$) was determined by $^{13}$C NMR.

Preparation of Supported Carbamate/MAO/SiO$_2$ Catalysts

Preparation of MAO/SiO$_2$

Silica (600 g, Grace-Davison-955, 600° heated/N$_2$/6 hr to partially dehydroxylate) was slurried up in dry toluene (2342 g, <40 ppm H$_2$O, N$_2$ purged). At ambient temperature, 715 ml (615 g) of 30 wt. % MAO in toluene is added. A temperature rise of 10° occurs as the MAO reacts with the silica's hydroxyl groups, etc. This is mixed for 5 hr at 90°–95° under 10 psi N$_2$. The system is cooled over 18 hr period and dried of toluene by heating to 60°/~100 mm Hg vacuum. After the slurry has dried to a mud, a sweep of nitrogen is used to remove residual toluene and render the residue into a free-flowing powder. Typical analyses are 3.4 mmole Al/g.

Example 12

A solution of the carbamate precursor was prepared as follows: The indenyl zirconium tris(diethylamide) (0.295 g, 0.54 mmole Zr, 19062-98-B) in 30 ml hexanes was reacted with 36 ml CO$_2$ (STP, 2.98 CO$_2$/Zr) at atm. pressure for 2½ hr. This solution, in the drybox, was added to 103.3 g of MAO/SiO$_2$ (3.25 mmole Al/14.1% toluene) in ~500 ml of N$_2$ purged hexanes over about 2–3 min. period. All the yellow color of the precursor immediately adsorbed onto the MAO/SiO$_2$. This was left to stand over night. The clear, colorless, supernatant solution was decanted and the remainder pumped dry (to .01 mm Hg/r.t.) to yield a fine light-yellow free flowing powder.

Polymerization activities, variation with time, effect of reaction temperature and added hexene-1 are reported in Table 8. Effect of polymerization variables is reported in Table 9.

TABLE 8

Results of Polymerization Using a MAO/SiO$_2$ Supported Indene Zirconium Tris(Diethyl Carbamate) Catalyst[a]

| Activity | | | | | | | |
|---|---|---|---|---|---|---|---|
| (g PE/hr-mmole Zr-100 psi ethylene) | 27,400[b] | 19,300[c] | 22,500[d] | 23,600[e] | 29,800 | 7,300 | 8,700 |
| Hexene-1 (ml) | 0 | 0 | 0 | 0 | 0 | 0 | 100 |
| Temperature (°) | 65 | 65 | 65 | 65 | 85 | 95 | 65 |

[a]Standard conditions: 200 psi ethylene, 1.5 mmole tris-(n-hexy)aluminum, 2 mmole catalyst, no H$_2$; heterogenous catalyst preparation method A.
[b]Ran 24 hr. after catalyst preparation.
[c]Ran 54 hr. after catalyst preparation.
[d]Ran 144 hr. after catalyst preparation.
[e]Ran for 1.5 hr., catalyst activity (half-life ~ 1.5 hr.).

TABLE 9

Results of Polymerization Studies with η$^5$-Indenyl Zirconium Tris(Diethyl-Carbamate) on MAO/SiO$_2$ Catalyst[a] (Heterogeneous Catalyst Preparation Method A)

| Activity | | | | | | | | | |
|---|---|---|---|---|---|---|---|---|---|
| (g PE/hr-mmole Zr-100 psi ethylene) | 12,700 | 4,300 | 4,900 | 2,200 | 12,500 | 17,600 | 21,000 | 11,400 | 6,300 |
| Hydrogen (ml) | 0 | 0 | 0 | 0 | 60 | 120 | 240 | 120 | 120 |
| Hexene-1 (ml) | 0 | 50 | 100 | 200 | 0 | 0 | 0 | 100 | 200 |

TABLE 9-continued

Results of Polymerization Studies with $\eta^5$-Indenyl
Zirconium Tris(Diethyl-Carbamate) on MAO/SiO$_2$ Catalyst[a]
(Heterogeneous Catalyst Preparation Method A)

| | | | | | | | | | |
|---|---|---|---|---|---|---|---|---|---|
| BBF | — | 3.0 | 4.8 | 12.8 | — | — | — | 8.4 | 17.3 |
| FI | — | NF | — | NF | NF | NF | 0.3 | 16.2 | 65.7 |
| MFR | — | — | — | — | — | — | 19.8 | 23 | 13.0 |
| SEC-PDI | 7.4 | | | | | | 7.6 | 4.5 | |
| MW | 172,000 | | | | | | 145,000 | 40,000 | |

[a]Polymerization under standard conditions footnote a, Table 8, except for added hexene-1 and hydrogen.

Example 13

Preparation of $\eta^5$-Indenyl Zirconium Tris(Diethyl Carbamate)/MMAO/SiO$_2$.

Toluene (5.0 ml) was used to dilute 2.4 ml of a 30% MAO solution in toluene. To this 0.5 ml of a carbamate solution in toluene (21.5 mmole Zr) was added and mixed well at room temperature. This solution was added drop-wise to a slurry of 4.0 g 955°–600° C. silica in 20 ml toluene and stirred for 1 hr. The volatiles were pumped off at 0.1 mm Hg and room temperature.

Analyses for Al, Si and Zr showed that this powder had an Al/Zr—380 (350 calculated) and 5.5 mmole Zr/g; 4.5 calculated).

Results of polymerization are reported in Table 10.

TABLE 10

Results of Preparation of Catalysts Based on Indenyl Zirconium
Diethyl Carbamate + MAO or MMAO Reaction
Product Deposited on Silica[a]
(Heterogeneous Catalyst Preparative Method B)

| | | | | |
|---|---|---|---|---|
| Al/Zr (mole) | 380[b] | 191[c] | 191[c] | 191[c] |
| [Zr] (mmole/g) | 5.5 | 14.8 | 14.8 | 14.8 |
| Activity | | | | |
| (g PE/hr-mmole Zr-100 psi ethylene) | 64,900 | 25,100 | 26,800 | 22,400 |
| Temperature (°C.) | 85 | 85 | 85 | 85 |
| Length of Run (min.) | 30 | 10 | 30 | 180 |

[a]~2 mmole Zr, no H$_2$ or hexene-1, 200 psi ethylene, 1.5 mmole Al as tri-isobutylaluminum.
[b]Catalyst was prepared by adding the carbamate (hexane solution) to a toluene solution of MAO, reacting for 15 min. at r.t. and addition of this to a silica slurry in toluene. Stirred for 1 hr. + and dried up in vacuum to a powder.
[c]MMAO (heptane) was reacted with the hexane-carbamate solution for 1.5 hr. This was added to a silica slurry in hexanes, reacted for 1.3 hr. and dried up in vacuum to a powder.

TABLE 11

Horizontally Mixed Reactor Polymerization Data and Product Property Summary

| Run | A | B | C | D | E | F | G |
|---|---|---|---|---|---|---|---|
| Reaction Conditions | | | | | | | |
| Pressure (psig) | 350 | 350 | 350 | 350 | 350 | 350 | 350 |
| Temperature (°C.) | 80 | 80 | 80 | 80 | 80 | 80 | 75 |
| Ratios: H$_2$/C$_2$ | 0 initially 0.00055 | 0 initially 0.0003 | 0 | 0 | 0 | 0 | 0 |
| C$_6$/C2 | 0.038 | 0.038–0.055 | 0.08 | 0.068 | 0.068 | 0.088 | 0.012 |
| Ethylene Pressure (psi) | 240 | 240 | 240 | 240 | 240 | 240 | 180 |
| Max. Production Rate (lb/hr) | 6.0 | 5.8 | 6.2 | 6.6 | 10.3 | 5.7 | 6.6 |
| Catalyst | | | | | | | |
| Catalyst Type | 16 μm/g Ind. Carbamate on MAO Silica[a] | 30 μm/g Ind. Carbamate on MAO Silica[a] | 30 μm/g Ind. Carbamate on MAO Silica[a] | 12 μm/g Ind. Carbamate + MMAO Silica[b] | 7 mM Ind. Carbamate in iC$_5$[c] | 7 mM Ind. Carbamate in iC$_5$[c] | 7 mM Bis(Ind) C$_2$H$_4$[d] in iC$_5$ |
| Cat Feed Rate (mmole Zr/hr) | 0.2 | 0.19 | 0.2 | 0.18 | 0.25 | 0.22 | |
| Cat Carrier | 10 TIBA/iC$_5$ | 10% TIBA/iC$_5$ | 10% TIB./iC$_5$ | 10% TIBA/iC$_5$ | 15% MMAO-3A/iC$_5$ | 15% MMAO-3A/iC$_5$ | → |
| Cocatalyst | 10% TIBA/iC$_5$ | 10% TIBA/iC$_5$ | 10% TIBA/iC$_5$ | 10% TIBA/iC$_5$ | 15% MMAO-3A/iC$_5$ | 15% MMAO-3A/iC$_5$ | → |
| Cocatalyst Feed Rate (cc/hr) | 80 | 93 | 86 | 73 | 57 | | |
| Al/Zr Molar Feed Ratio | 130 | 160 | 140 | 130 | 490 | 490 | 300 |
| Pre-Bed Passivation | 50 ml TIBA | 50 ml TIBA | 50 ml TIBA | 50 ml TIBA | 50 ml MMAO | 50 ml MMAO | → |

TABLE 11-continued

| | Horizontally Mixed Reactor Polymerization Data and Product Property Summary | | | | | | |
|---|---|---|---|---|---|---|---|
| Run | A | B | C | D | E | F | G |
| Resin Properties | | | | | | | |
| Melt Index (dg/min) | 13.9 | 7.3 | 3.0 | 2.1 | 6.5 | 10.3 | 3.7 |
| Flow Index (dg/min) | 269 | 134 | 59 | 40 | 26.6 | 227 | 139 |
| Density (g/ml) | 0.933 | 0.932 | 0.920 | 0.923 | 0.918 | 0.913 | 0.918 |
| Bulk Density (lb/ft$^3$) | 26.2 | 24.5 | 26.1 | 29.5 | 24.2 | 24.3 | 23.1 |
| Average Particle Size (in) | 0.014 | 0.018 | 0.016 | 0.017 | 0.057 | 0.050 | 0.088 |
| Quantity (lb) | 20.6 | 28.2 | 28.9 | — | 28 | 26.8 | 28.6 |
| Zr (ppm) | 4.35 | 3.9 | 5.1 | 2.25 | 4.7 | 2.65 | 2.35 |

[a]Heterogeneous catalyst Preparative Method A for SiO$_2$ supported carbomate catalyst.
[b]Heterogeneous catalyst Preparative Method C for SiO$_2$ supported carbomate catalyst.
[c]$\eta^5$-Indenyl Zirconium Tris(Diethylcarbamate) reacted with MMAO (4.0 hr) and injected as a liquid into reactor.
[d]Liquid feed of bis(indenyl)ethane bis[(zirconium tris(diethylcarbamate)] MMAO reaction product in i-pentane.

Example 14

Synthesis of (Ind)Zr(O$_2$CCMe$_3$)$_3$ (Ind)Zr(NEt$_2$)$_3$ ( 1.08 g, 2.55 mmol) was dissolved in 25 mL of toluene and cooled to −78° C. A −78° C. solution of pivalic acid (784 mg, 7.68 mmol) in 25 mL toluene was added with stirring. The solution was warmed to room temperature and stirred for 1 hr. Volatiles were removed under vacuum. Crystallization of the residue from pentane at −30° C. gave product as white crystals. $^1$H NMR (C$_6$D$_6$) d 7.41 (AA'BB', indenyl, 2H), 6.95 (AA'BB', indenyl, 2H), 6.74 (t, J=3.3 Hz, 2-indenyl, 1H), 6.39 (d, J=3.3 Hz, 1-indenyl, 2H), 1.10 (s, CH$_3$, 27 H).

Copolymerization with (Ind)Zr(O$_2$CCMe$_3$)$_3$ in Absence of Amine

A solution of (Ind)Zr(O$_2$CCMe$_3$)$_3$ (17.0 mg) in 25 mL of toluene was prepared. An aliquot of the solution (0.70 mL, 1 mmol) was used for ethylene-hexene copolymerization with MMAO. The yield of copolymer was 5.4 g which indicated an activity of 12,700 g PE/mmol Zr/100 psi/hr at 75° C. MI=0.06, FI=1, MFR = 16.7.

Example 15

Copolymerization with (Ind)Zr(O$_2$CCMe$_3$)$_3$ and 3 Equiv Piperidine

A solution of (Ind)Zr(O$_2$CCMe$_3$)$_3$ (13.0 mg, 0.026 mmol) and piperidine (8.0 mL, 0.081 mmol) in 2.0 mL of C$_6$D$_6$ was prepared. An aliquot of the solution (0.50 mL) was diluted to 25 mL with toluene, and 1 mmol was used for ethylene-hexene copolymerization with MMAO. The yield of copolymer was 47.9 g which indicated an activity of 113,000 g PE/mmol Zr/100 psi/hr at 75° C. GPC analysis indicated M$_w$=137,000 and M$_n$=48,000 for a PDI of 2.85. Hexene incorporation (12.6 butyls/1000 CH$_2$) was determined by $^{13}$C NMR.

Example 16

Reaction of [(Indenyl)Zr(NEt$_2$)$_3$], with 3 molar equivalents of a carboxylic acid, RCO$_2$H, produces [(Indenyl)Zr(O$_2$CR)$_3$], which when combined with trimethylaluminoxane, formed a highly active single-site catalyst for the copolymerization of ethylene and hexene. Specifically, the reaction of [(Indenyl)Zr(NEt$_2$)$_3$] with 3 molar equivalents of pivalic acid in benzene gave [(Indenyl)Zr(O$_2$C-t-Bu)$_3$]. This Zr pivalate catalyst (1 μmol) was reacted with MMAO (1000:1 Al:Zr) and used for ethylene-hexene copolymerization at 75° C. and 85 psi ethylene. During a 30 min reaction, 47.2 g of copolymer (M$_w$=145,800, M$_n$=47,600, PDI=3.06; MI=0.4, FI=7.4, MFR=19.5; BBF=12.7 Bu/1000 CH$_2$) were produced, corresponding to an activity of 111,000 g PE/mmol Zr/hr/100 psi C$_2$H$_4$.

Example 17

Polymerizations with Carbamate Based Catalyst

The reaction product of bis-(indenyl)ethane with one mole of zirconium tetra(diethylamide) followed by carbon dioxide and MMAO (BIEMC), results in a catalyst with very high EPDM polymerization activity (42,000 g EPDM/mmol Zr. h at Al/Zr=1200). Even higher productivity was observed using MAO at same Al/Zr ratio. The MMAO produced a better comonomer response and lower MW (30% C$_3$, FI=423) than MAO (18% C$_3$, FI=113).

We claim:

1. A catalyst precursor of the formula

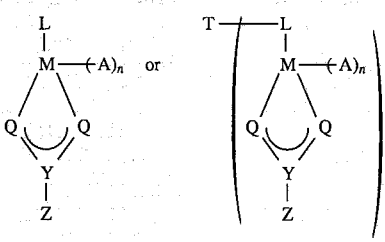

wherein:

M is Zr or Hf;

L is a substituted or unsubstituted cyclopentadienyl ligand;

Q can be the same or different and is independently selected from the group consisting of —O—, —NR—, —CR$_2$— and —S—;

Y is either C or S;

Z is selected from the group consisting of —OR, —NR$_2$, —CR$_3$, —SR, —SiR$_3$, —PR$_2$ and —H, with the proviso that when Q is —NR— then Z is selected from the group consisting of —OR, —NR$_2$, —SR, —SiR$_3$, —PR$_2$ and —H;

n is 1 or 2;

A is a univalent anionic group when n is 2 or A is a divalent anionic group when n is 1;

R can be the same or different and is independently a group containing carbon, silicon, nitrogen, oxygen, and/or phosphorus and one or more R groups may optionally be attached to the L substituent;

T is a bridging group selected from the group consisting of an alkylene or arylene group containing from 1 to 10 carbon atoms, germanium, silicon and alkyl phosphine; and m is 1 to 7.

2. The catalyst precursor of claim 1 wherein M is hafnium.

3. The catalyst precursor of claim 1 wherein M is zirconium.

4. The catalyst precursor of claim 1 wherein Q is oxygen.

5. The catalyst precursor of claim 1 wherein Y is carbon.

6. The catalyst precursor of claim 1 wherein Z is selected from the group consisting of —OR, —CR$_3$ and —NR$_2$.

7. The catalyst precursor of claim 6 wherein R is a hydrocarbon group containing from 1 to 20 carbon atoms.

8. The catalyst precursor of claim 7 wherein R is an alkyl, cycloalkyl or an aryl group.

9. The catalyst precursor of claim 1 wherein L is a substituted cyclopentadienyl ligand.

10. The catalyst precursor of claim 9 wherein L is an indenyl group.

11. The catalyst precursor of claim 1 wherein T is an ethylene group.

12. The catalyst precursor of claim 1 wherein T is a silicon.

13. The catalyst precursor of claim 1 wherein:
M is Zr;
L is an indenyl group;
Q is —O—;
Y is carbon;
Z is —CR$_3$;
n is 2;
A is a heteroallyl moiety described by the combination of Q, Y and Z; and
R is a tertiary butyl group.

14. The catalyst precursor of claim 1 wherein:
M is Zr;
L is an indenyl group;
Q is —O— at one location and —NR— at the other location;
Y is carbon;
Z is —CR$_3$;
n is 2;
A is a heteroallyl moiety described by the combination of Q, Y and Z; and
R is a phenyl group.

15. The catalyst precursor of claim 1 wherein:
M is Zr;
L is an indenyl group;
Q is —O—;
Y is carbon;
Z is —NR$_2$;
n is 2;
A is a heteroallyl moiety described by the combination of Q, Y and Z; and
R is an ethyl group.

16. A catalyst system comprising the catalyst precursor of claim 1 and a cocatalyst selected from the group consisting of (a) branched or cyclic oligomeric poly(hydrocarbylaluminum oxide) that contain repeating units of the general formula —(Al(R)O)—, where R is an alkyl radical containing from 1 to about 12 carbon atoms, or an aryl radical such as a substituted or unsubstituted phenyl or naphthyl group and (b) borates.

17. The catalyst system of claim 16 wherein the cocatalyst is a branched or cyclic oligomeric poly(hydrocarbylaluminum oxide).

18. The catalyst system of claim 17 wherein the cocatalyst is an aluminoxane.

19. The catalyst system of claim 16 wherein the catalyst precursor is preactivated with an amine.

20. The catalyst system of claim 15 wherein the amine is added in an amount ranging from 0.1 to 10 moles of amine per mole of transition metal.

21. A catalyst precursor of the formula $$\begin{array}{c}L\\|\\M\!-\!\!(A)_n\\/\phantom{xx}\\Q\phantom{x}Q\\\diagdown\phantom{x}\diagup\\Y\\|\\Z\end{array} \quad \text{or} \quad \left[\begin{array}{c}T\!-\!\!-L\\\phantom{xx}|\\\phantom{xxx}M\!-\!\!(A)_n\\\phantom{xx}/\phantom{xx}\\\phantom{xx}Q\phantom{x}Q\\\phantom{xx}\diagdown\phantom{x}\diagup\\\phantom{xxx}Y\\\phantom{xxx}|\\\phantom{xxx}Z\end{array}\right]_m$$

wherein:
M is Zr or Hf;
L is a substituted cyclopentadienyl ligand;
Q is oxygen;
Y is carbon;
Z is selected from the group consisting of —OR, —CR$_3$ and —NR$_2$;
n is 2;
A is a univalent anionic group;
R is an alkyl, cycloalkyl or an aryl group containing from 1 to 20 where one or more R groups may optionally be attached to the L substituent;
T is a bridging group connecting selected from the group consisting of alkylene or arylene group containing from 1 to 10 carbon atoms; and
m is 2 or 3.

* * * * *